(12) United States Patent
McKeown et al.

(10) Patent No.: US 9,018,270 B2
(45) Date of Patent: Apr. 28, 2015

(54) METHOD FOR PRODUCING POLYMERS COMPRISING MULTIPLE REPEAT UNITS OF BICYCLIC DIAMINES

(75) Inventors: Neil Bruce McKeown, South Glamorgan (GB); Mariolino Carta, South Glamorgan (GB); Matthew James Croad, Somerset (GB)

(73) Assignee: University College Cardiff Consultants Limited, Cardiff South Glamorgan (GB)

( * ) Notice: Subject to any disclaimer, the term of this patent is extended or adjusted under 35 U.S.C. 154(b) by 0 days.

(21) Appl. No.: 13/822,900

(22) PCT Filed: Sep. 12, 2011

(86) PCT No.: PCT/GB2011/051703
§ 371 (c)(1),
(2), (4) Date: Jun. 27, 2013

(87) PCT Pub. No.: WO2012/035327
PCT Pub. Date: Mar. 22, 2012

(65) Prior Publication Data
US 2013/0267616 A1 Oct. 10, 2013

(30) Foreign Application Priority Data

Sep. 15, 2010 (GB) .................................. 1015397.1

(51) Int. Cl.
*C08G 73/06* (2006.01)
*C08G 12/08* (2006.01)
*C08G 12/26* (2006.01)

(52) U.S. Cl.
CPC ............ *C08G 73/0694* (2013.01); *C08G 12/08* (2013.01); *C08G 12/26* (2013.01)

(58) Field of Classification Search
CPC .... C08G 73/0604; C08G 73/06; C08G 12/08; C08G 12/26
USPC ........... 521/27, 25, 50, 71; 525/417; 528/210, 528/391, 401, 403, 423
See application file for complete search history.

(56) References Cited

U.S. PATENT DOCUMENTS

2007/0140907 A1  6/2007 Rakow et al.
2009/0057233 A1  3/2009 Redko et al.

FOREIGN PATENT DOCUMENTS

EP        0352776 A2   1/1990

OTHER PUBLICATIONS

X. Du et al. "Troger base-functionalized organic nanoporous polymer for heterogeneous catalysis", Chem. Communication, 2010, 46, 970-972.*
X. Du et al. "Troger base-functionalized organic nanoporous polymer for heterogeneous catalysis", Chem. Communication, 2010, 46, 970-972.*
D. Xin et al., "Troger's base-functionalised organic nanoporous polymer for hetergeneous catalysis," Chem. Comm., Dec. 14, 2009, pp. 970-972.
U. Kiehne et al., "Diastereoselective Self-Assembly of Double-Stranded Helicates from Troger's Base Derivatives," Organic Letters, vol. 9, No. 7, Mar. 1, 2007, pp. 1283-1286, XP55013522.
A. Abdolmaleki et al., "Noncoplanar rigid-rod aromatic polyhydrazides containing Troger's base," Journal of Appled Polymer Science, 2011, vol. 22, pp. 282-288.
L.R.C. Barclay & R.A. Chapman, "9,10-Dimethyl- and 9,10-Diphenyl-9, 10-Dihydro-9, 10-Ethano-anthracene by Friedel-Crafts cycliakylations of 1,4-Diarylsubstituted-1,4-Diols," Canadian Journal of Chemistry, 1965, vol. 43, pp. 1754-1760.
L.R.C. Barclay & R.A. Chapman, "1,1'-Spirobiindanes," Canadian Journal of Chemisry, 1964, vol. 42, pp. 25-35.
Y. Sakaguchi & F.W. Harris, "Synethesis and characterization of aromatic polyamides derived from new phenylated aromatic diamines," Polymer Journal, 1992, vol. 24, No. 10, pp. 1147-1154.
D. Didier et al., "Functionalized analogues of Troger's base: scope and limitations of a general synthetic procedure and facile, predictable method for the separation of enantionmers," Tetrahedron, 2008, vol. 64, pp. 6252-6262.
J. Weber et al., "Exploring polymer of intrinsic microporosity—microporous, soluble polyamide and polyimide," Macromolecular Rapid Communications, 2007, vol. 28, pp. 1871-1876.
C. Gao et al.,"Syntheses of biphenyl polyimides vai nickel-catalyzed coupling polymerization of bis(chlorophthalimide)s," Macromolecules, 2003, vol. 36, pp. 5559-5565.
I.V. Farr et al., "The synthesis and characterization of polyimide homopolymers based on 5(6)-Amino-1-(4-aminophenyl)-1, 3,3-trimethylindane," Journal of Polymer Science Part A: Polymer Chemistry, 2000, vol. 38, 2840-2854.
J. Wu et al., "Dynamic [2]Catenanes based on a hydrogen bonding-mediated bis-zinc porphyrin foldamer tweezer: A Case Study," J. Org. Chemical 2007, 72, pp. 2897-2905.
P. Ganesan et al., Tetrahedral n-type materials: Efficient quenching of the excitation of p-type polymers in amorphous films, J. Am. Chem. Soc., 2005, vol. 127, pp. 14530-14531.
M.H. Yi et al., "Synthesis and characterization of soluble polyimides from 2,2-Bis(4-aminophenyl)cycloalkane derivatives," Journal of Polymer Science: Part A: Polymer Chemistry, 1999, vol. 37, pp. 3449-3454.
J.H. Chong & M.J. MacLachlan, "Robust non-interpenetrating coordination frameworks from new shape-persistent builiding blocks," Inorganic Chemistry, 2006, vol. 45, No. 4, pp. 1442-1444.
International Search Report and Written Opinion, Application No. PCT/GB2011/051703, Date of Mailing Dec. 15, 2011.

* cited by examiner

*Primary Examiner* — Michael M Bernshteyn
(74) *Attorney, Agent, or Firm* — Ostrolenk Faber LLP.

(57) ABSTRACT

A method of forming a polymer is provided, the method comprising: Providing a first monomer comprising one or more aromatic moieties, the first monomer comprising at least two amino groups, each of the amino groups being attached to an aromatic moiety; and contacting said first monomer with formaldehyde or a source of methylene. Polymers made by such a method and uses of such polymers are also described.

19 Claims, No Drawings

METHOD FOR PRODUCING POLYMERS COMPRISING MULTIPLE REPEAT UNITS OF BICYCLIC DIAMINES

This application is the United States national phase filing of the corresponding international application number PCT/GB2011/051703, filed on Sep. 12, 2011, which claims priority to and benefit of GB Application No. 1015397.1, filed Sep. 15, 2010, which applications are hereby incorporated by reference in their entirety.

The present invention relates to a method of forming a polymer, particularly, but not exclusively, a method of forming a polymer comprising multiple methanodibenzo diazocine (systematic name=6H,12H-5,11-methanodibenzo[b,f][1,5]diazocine) moieties. Such moieties are more commonly known as Troger's base moieties. The present invention also provides polymers producible using such methods and uses of such polymers.

When making polymers that contain bicyclic diamines, it is possible to synthesise a monomer comprising the bicyclic diamine unit and then polymerise that monomer. A potential disadvantage with this method is that one has to synthesise the monomer comprising the bicyclic structure and then polymerise the monomer.

The present invention seeks to address one or more of the problems mentioned above in relation to the prior art.

There is provided in accordance with a first aspect of the present invention, a method of forming a polymer, the method comprising:

Providing a first monomer comprising one or more aromatic moieties, the first monomer comprising at least two amino groups, each of the amino groups being attached to an aromatic moiety; and contacting said first monomer with formaldehyde or a source of methylene.

Formaldehyde can be introduced into the reaction in a number of forms such as an aqueous solution (i.e., formalin), or as diethoxymethane (i.e., formaldehyde diethyl acetal) or as paraformaldehyde or as 1,3-dioxane, 1,3-dioxolane, or as hexamethylenetetramine, or as dimethylsulfoxide, or as 1,3,5-trioxane, or preferentially, as dimethoxymethane (i.e., formaldehyde dimethyl acetal). The source of methylene may comprise paraformaldehyde, 1,3-dioxane, 1,3-dioxolane, 1,3,5-trioxane, or dimethoxymethane, for example.

The method of the present invention provides an efficient method for producing a polymer comprising multiple repeat units of bicyclic diamine groups.

For the avoidance of doubt, it is hereby stated that amino is —$NH_2$.

The formaldehyde or source of methylene reacts to form a bridge between the nitrogen atoms of the (formerly) amino groups and said nitrogen atoms and an adjacent aromatic moiety.

The first monomer may comprise two (and only two) amino groups, or the first monomer may comprise more than two (e.g. three, four, five or six) amino groups.

Two amino groups may be provided on one aromatic moiety. Alternatively, two amino groups may be provided on mutually different aromatic moieties. For example, the first monomer may comprise a biphenyl group, with one of two amino groups being provided on one phenyl ring and the other of the amino groups being provided on the other phenyl ring. Alternatively, two amino groups may be provided on one of the phenyl rings.

Said one or more aromatic moieties may comprise one or more rings. For example, the one or more aromatic moiety may comprise naphthyl or anthracyl. It is preferred, however, that the said one or more aromatic moieties comprises a six-membered aromatic ring of carbon atoms. For example, the first monomer may comprise two six-membered aromatic rings of carbon atoms, each being provided with one amino group. The six-membered aromatic rings are optionally provided with substituents in addition to the aforementioned amino groups.

It is preferred that the amino groups are directly bonded to the respective aromatic moiety or moieties i.e. without any linking groups between the amino group and the aromatic moiety.

The one or more aromatic moieties may be provided with substituents in addition to the aforementioned amino groups. For example, the first monomer may be provided with a further (i.e. third) amino group. This further (third) amino group may undergo reaction with the formaldehyde or source of methylene, and may lead to the formation of a branched or cross-linked polymer. The first monomer may be provided with three amino groups, each amino group being attached to mutually different aromatic moieties (typically six-membered aromatic rings of carbon atoms). The first monomer may be provided with four amino groups. Each of the four amino groups may be attached to mutually different aromatic moieties (typically six-membered aromatic rings of carbon atoms).

It is preferred that there is provided, adjacent to the carbon atom to which one of the at least two amino groups is attached, an unsubstituted aromatic carbon atom.

There may be provided, adjacent to each of the carbon atoms to which each of the at least two amino groups is attached, an unsubstituted aromatic carbon atom.

A substituent may optionally be provided on an aromatic carbon atom adjacent to a carbon atom to which at least one of the at least two amino groups is attached. Therefore, one unsubstituted aromatic carbon atom and one aromatic carbon atom provided with a substituent may be provided adjacent to a carbon atom to which at least one of the at least two amino groups is attached.

An electron-donating substituent may be provided on the aromatic moiety to which an amino group is attached. The electron-donating substituent may be located so as to activate the substitution site adjacent to the carbon to which the amino group is attached. The electron-donating group is preferably located to avoid activation of substitution sites other than that adjacent to the carbon to which the amino group is attached. The identity of such electron donating groups will be well known to those skilled in the art, but include methyl and methoxy groups. It is generally disadvantageous for an aromatic moiety to which an amino group is attached to be provided with an electron-withdrawing substituent (such as a nitro or cyano group), especially if the electron-withdrawing substituent is located so as to deactivate the substitution site adjacent to the carbon to which the amino group is attached.

The method may be performed using step-growth polymerisation or condensation polymerisation (as opposed to chain growth polymerisation). The method may therefore comprise the initial formation of a large number of oligomeric species which then react with one another to form larger species.

The method may comprise performing the polymerisation in the presence of an acid, for example, trifluoroacetic acid.

The method may comprise forming the polymer at an interface between two immiscible liquids or at the surface of a solid support such as a macroporous substrate or a fibre.

The method may comprise forming the polymer into fibres.

The method may comprise forming a polymeric bicyclic diamine and subsequently forming therefrom a polymeric quaternary ammonium cationic polymer. This may be achieved by forming quaternary ammonium groups from the amine groups of the polymer. This may typically be achieved, for example, by reacting the polymeric bicyclic diamine with an alkyl halide (such as methyl iodide) or dimethyl sulfate.

The formation of the quaternary ammonium cation groups may also form cross-links in the polymer. The may be achieved, for example, by reacting the polymeric bicyclic diamine with an alkyl dihalide, such as 1,6-dibromohexane or α,α-dibromo-p-xylene.

The method may comprise forming a polymeric quaternary ammonium cationic polymer with a first counter-anion and exchanging said first counter-anion for a second counter-anion. For example, it may be convenient to form the polymeric quaternary ammonium cationic polymer with a bromide counter-anion, and then to perform anion exchange to introduce a different counter-anion to the polymer.

The average degree of polymerisation may be 10 or more, optionally 30 or more, preferably 50 or more and more preferably 100 or more. Degree of polymerisation is preferably calculated using the number average molecular mass.

Those skilled in the art will realise that the method of the first aspect of the present invention may be used to make copolymers. The method may therefore comprise providing a second monomer having a different structure from the first monomer, the second monomer comprising one or more aromatic moieties, the second monomer comprising at least two amino groups, each of the amino groups being attached to an aromatic moiety. The second monomer may comprise the same features as the first monomer as described above.

The method may comprise contacting the second monomer with the first monomer and the formaldehyde or the source of methylene. Alternatively or additionally, the method may comprise contacting the second monomer with the formaldehyde or the source of methylene and an oligomer formed from the first monomer. This may be performed, for example, by not adding the second monomer to the reaction mixture at the start of the reaction, but by first reacting the formaldehyde or the source of methylene with the first monomer so as to form an oligomer of the first monomer, and then adding the second monomer.

The first monomer (or second monomer, if present) may comprise a metal-bonding ring group, such as a Crown ether group.

The first monomer (or second monomer, if present) may comprise a spiro group.

The first monomer (or second monomer, if present) may comprise at least one chiral carbon atom.

There is provided in accordance with a second aspect of the present invention, a polymer which is producible using the method of the first aspect of the present invention.

There is provided in accordance with a third aspect of the present invention, a polymer having an average degree of polymerisation of at least 10 and comprising a plurality of the following unit:

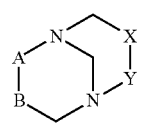

Structure 1 or the quaternary ammonium cation derivative of the unit of Structure 1.

Wherein A and B indicate carbon atoms belonging to a first aromatic moiety and wherein X and Y indicate carbon atoms belonging to a second aromatic moiety.

The polymer typically comprises a mixture of the two stereoisomers of the bicyclo diamine moiety.

The first and second aromatic moieties are not necessarily part of the Structure 1, but merely seek to define the structure of the bicyclic diamine moiety.

Those skilled in the art will realise that the polymer may comprise one or both of the stereoisomers of Structure 1. The polymer may be a homopolymer or a heteropolymer.

The polymer may be a cyclic polymer, but is preferably a non-cyclic polymer.

The polymer may be a linear or a branched polymer. The polymer may be a cross-linked polymer.

A and B may be provided by a cyclic aromatic moiety comprising a total of 6 carbon atoms in the ring. Likewise, X and Y may be provided by a cyclic aromatic moiety comprising a total of 6 carbon atoms in the ring. Said cyclic aromatic moieties may be provided with one or more substituents (not being H). Said cyclic aromatic moieties may also be part of fused ring systems such as naphthalene, anthracene, pyrene, triptycene, dihydroanthracene, spirobisindanes, spirobisfluorenes.

It is preferred that the polymer comprises at least 10 and preferably at least 50 of the bicyclic diamine units of Structure 1.

A substituent may be provided on an aromatic carbon atom adjacent to one or more of A, B, X and Y. A substituent may be provided on the aromatic carbon atom adjacent to X or Y, but not on each of the aromatic carbon atoms adjacent X and Y. Likewise, a substituent may be provided on the aromatic carbon atom adjacent to A or B, but not on each of the aromatic carbon atoms adjacent A and B.

The polymer of the third aspect of the present invention may be made using the method of the first aspect of the present invention.

In accordance with the fourth aspect of the present invention, there is provided a microporous material comprising a polymer in accordance with the second or third aspects of the present invention.

For the avoidance of doubt, it is hereby stated that microporous material refers to a material possessing an interconnect system of voids of diameter less than 2 nm as defined by the International Union of Pure and Applied Chemistry. Such microporosity can be demonstrated by a high apparent surface area (e.g. greater than 150 m$^2$ g$^{-1}$) as determined by application of the BET model (or similar analysis) to low-pressure nitrogen or carbon dioxide adsorption data obtained at 77 K.

In accordance with a fifth aspect of the present invention, there is provided a separation membrane for separating first and second components, the separation membrane comprising a polymer in accordance with the second or third aspects of the present invention.

The separation membrane may be suitable for the separation of gases (e.g. $CO_2$ from $CH_4$, $CO_2$ form $H_2$, $CO_2$ from $N_2$, $O_2$ from $N_2$ etc.) or the purification of water.

In accordance with a sixth aspect of the present invention, there is provided an adsorbent material comprising a polymer in accordance with the second or third aspects of the present invention. The adsorbent material may be suitable for the adsorption of gases such as hydrogen, methane or carbon dioxide or toxic or odorous compounds or metal cations or metal nanoparticles. The adsorption of the gases or toxic or odours gases may be enhanced by the prior incorporation of the metal cations. The adsorbent material may be for use in gas separation, for example, in pressure or vacuum swing adsorption.

In accordance with a seventh aspect of the present invention, there is provided an optical sensor comprising a polymer in accordance with the second or third aspects of the present invention. Such an optical sensor is described in US2007/0140907 to Rakow et al. For example, the polymer of the second and third aspects of the present invention may be included in the active layers of a sensor.

In accordance with an eighth aspect of the present invention, there is provided a proton exchange membrane comprising a polymer in accordance with the second or third aspects of the present invention. Such a proton exchange membrane may be incorporated into a fuel cell.

In accordance with a ninth aspect of the present invention, there is provided a method of making a catalyst, the method comprising:
  (i) Providing a metal or metal cation having catalytic activity; and
  (ii) Contacting the metal or metal cations with a polymer in accordance with the second or third aspects of the present invention.

In accordance with a tenth aspect of the present invention, there is provided a catalyst comprising a polymer in accordance with the second or third aspects of the present invention and a catalytic metal ligated to said polymer.

In accordance with an eleventh aspect of the present invention, there is provided a catalytic material comprising a negatively charged catalyst and a polymer in accordance with the second or third aspects of the present invention.

In accordance with a twelfth aspect of the present invention, there is provided an ion exchange resin comprising a polymer in accordance with the second or third aspects of the present invention.

In accordance with a thirteenth aspect of the present invention, there is provided an anion exchange membrane comprising a polymer in accordance with the second or third aspects of the present invention.

The invention will now be described by way of example only.

EXAMPLE 1

The method of the present invention may be illustrated using a monomer comprising a single aromatic moiety provided with two amino groups. Briefly, 2-methyl-1,4-benzenediamine is mixed under acidic conditions with dimethoxymethane to form polymer 1 in accordance with reaction scheme 1.

Reaction scheme 1

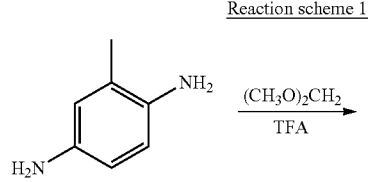

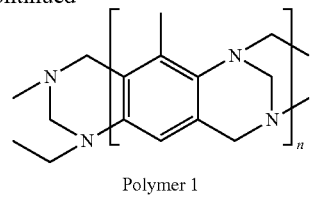

Polymer 1

Dimethoxymethane (2.90 mL, 4 equivalents; Aldrich) and 2-methyl-1,4-benzenediamine (1.00 g, 8.18 mmol; 1 equivalent; Aldrich) were added to vigorously stirred trifluoroacetic acid (10 mL). After 48 hours of stirring at 20° C., water (100 mL) was added to the reaction mixture and the pH increased to 9 by the dropwise addition of 1M aqueous sodium hydroxide solution. The precipitate was collected by filtration, dried in air and then washed repeatedly with tetrahydrofuran. The crude polymer was heated overnight in a mixture of acetone and methanol (1:1), collected by filtration and dried in a vacuum oven at 50° C. to give an off-white solid, which was partially soluble in chloroform (1.19 g, 79% Yield). $^1$H NMR (400 MHz; d-chloroform) δ 6.82 (br s, 1H), 4.02 (br m, 6H), 2.34 (br s, 3H). Molecular mass: (Gel Permeation Chromatography, eluent =CHCl$_3$, against polystyrene standards: $M_n$=2,800; $M_w$=6,900.

BET surface area=156 m$^2$/g; total pore volume=0.26 cm$^3$/g at (P/P$_0$) 0.98, adsorption; TGA analysis (nitrogen): 5% loss of weight occurred at ~300° C. Initial weight loss due to thermal degradation commences at ~385° C.

EXAMPLE 2

The method of the present invention may be illustrated using a monomer comprising a single aromatic moiety provided with two amino groups. Briefly, 2-methyl-1,3-benzenediamine is mixed under acidic conditions with dimethoxymethane to form polymer 2 in accordance with reaction scheme 2.

Reaction scheme 2

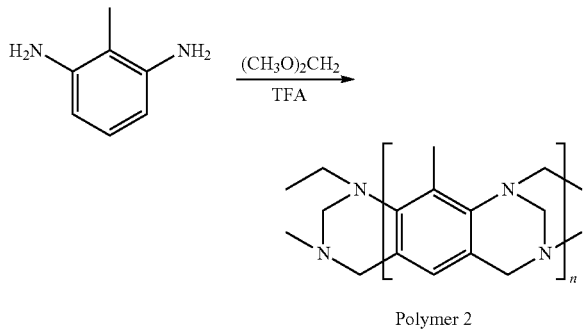

Polymer 2

Dimethoxymethane (2.90 mL, 4 equivalents; Aldrich) and 2-methyl-1,3-benzenediamine (1.00 g, 8.18 mmol; 1 equivalent; Aldrich) were added to vigorously stirred trifluoroacetic acid (10 mL). After 48 hours of stirring at 20° C., water (100 mL) was added to the reaction mixture and the pH increased to 9 by the dropwise addition of 1M aqueous sodium hydroxide solution. The precipitate was collected by filtration, dried in air and then washed repeatedly with tetrahydrofuran. The crude polymer was heated overnight in a mixture of acetone and methanol (1:1), collected by filtration and dried in a vacuum oven at 50° C. to give an off-white solid (1.37 g, 91% Yield). $^1$H NMR (400 MHz; d-chloroform) δ 6.30 (br s, 1H), 4.11 (br m, 6H), 2.35 (br s, 3H). Molecular mass: (Gel Permeation Chromatography, eluent =CHCl$_3$, against polystyrene standards) $M_n$=3,800; $M_w$=8,100. BET surface area=504 m²/g; total pore volume=0.37 cm³/g at (P/P$_0$) 0.98, adsorption; TGA analysis (nitrogen): 5% loss of weight occurred at ~310° C. Initial weight loss due to thermal degradation commences at ~380° C.

Examples 1 and 2 were reproduced successfully using 4 equivalents of paraformaldehyde instead of dimethoxymethane.

EXAMPLE 3

The method of the present invention may be illustrated using a monomer already containing a Troger's base core and with two amino groups. Briefly, 6H,12H-5,11-methanodibenzo[b,f][1,5]diazocine-2,8-diamine, 4,10-dimethyl is mixed under acidic conditions with dimethoxymethane to form polymer 3 in accordance with reaction scheme 3.

Reaction scheme 3

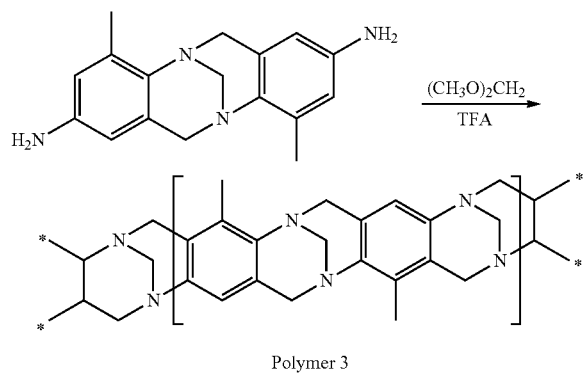

Polymer 3

A mixture of 4,10-dimethyl-6H,12H-5,11-methanodibenzo[b,f][1,5]diazocine-2,8-diamine, (0.90 g, 3.21 mmol, 1 eq, made by the reduction of the dinitro derivative prepared in one step using the published procedure of D. Didier et al./Tetrahedron 64 (2008) 6252-6262) and dimethoxymethane (0.91 mL, 10.27 mmol, 3.2 equivalents, Aldrich) was added under vigorous stirring to trifluoroacetic acid (10 mL). The reaction was quenched with water (100 mL) and basified by adding dropwise an aqueous solution of NaOH until pH ~9. The resulting solid was filtered off and dried under vacuum to give the final polymer as a white solid (0.951 g, 93% based on the repeated unit); $^1$H NMR (400 MHz; CDCl$_3$) δ (ppm) 6.84 (br s, 1H), 4.02 (br m, 6H), 2.32 (br s, 3H); Molecular mass: (Gel Permeation Chromatography, eluent =CHCl$_3$, against polystyrene standards: $M_n$=8,000; $M_w$=17,500. BET surface area=772 m²/g; total pore volume=0.54 cm²/g at (P/P$_0$) 0.98, adsorption; TGA analysis (nitrogen): 5% loss of weight occurred at ~300° C. Initial weight loss due to thermal degradation commences at ~385° C.

EXAMPLE 4

The method of the present invention may be illustrated using a monomer already containing a Troger's base core and with two amino groups. Briefly, 6H,12H-5,11-methanodibenzo[b,f][1,5]diazocine-3,9-diamine, 4,10-dimethyl is mixed under acidic conditions with dimethoxymethane to form polymer 4 in accordance with reaction scheme 4.

Reaction scheme 4

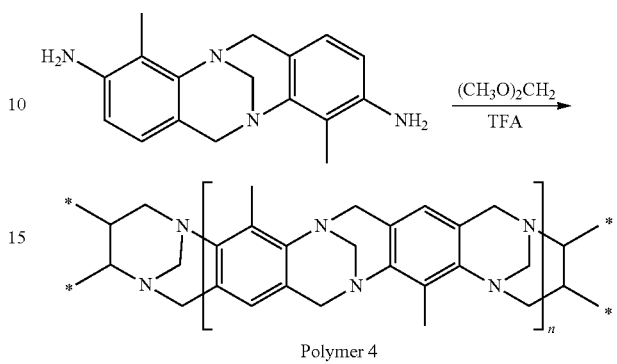

Polymer 4

A mixture of 4,10-dimethyl-6H,12H-5,11-methanodibenzo[b,f][1,5]diazocine-3,9-diamine, (0.90 g, 3.21 mmol, 1 eq, made by the reduction of the appropriate dinitro derivative prepared in one step using the published procedure of D. Didier et al./Tetrahedron 64 (2008) 6252-6262) and dimethoxymethane (0.91 mL, 10.27 mmol, 3.2 equivalents, Aldrich) was added under vigorous stirring to trifluoroacetic acid (10 mL). The reaction was quenched with water (100 mL) and basified by adding dropwise a solution of aqueous NaOH until pH ~9. The resulting solid was filtered off and dried under vacuum to give the final polymer as an off-white solid (0.725 g, 71% based on the repeated unit); $^1$H NMR (400 MHz; CDCl$_3$) δ 6.30 (br m, 1H), 4.11 (br m, 6H), 2.35 (br m, 3H); Molecular mass: (Gel Permeation Chromatography, eluent =CHCl$_3$, against polystyrene standards: $M_n$=9,500; $M_w$=18,000. BET surface area=570 m²/g; total pore volume=0.38 cm³/g at (P/P$_0$) 0.98, adsorption; TGA analysis (nitrogen): 5% loss of weight occurred at ~310° C. Initial weight loss due to thermal degradation commences at ~380° C.

EXAMPLE 5

The method of the present invention may be illustrated using a monomer comprising a single aromatic moiety provided with two amino groups. Briefly, 2,5-dimethoxy-1,4-benzenediamine is mixed under acidic conditions with paraformaldehyde to form polymer 5 in accordance with reaction scheme 5.

Reaction scheme 5

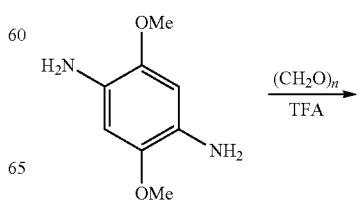

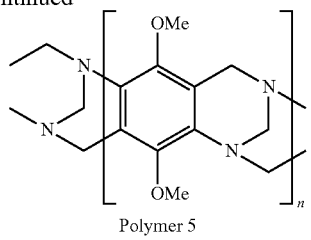

Polymer 5

Paraformaldehyde (715 mg, 4 equivalents; Aldrich) and 2,5-dimethoxy-1,4-benzenediamine (1.00 g, 5.94 mmol; 1 equivalent; made in two steps from the nitration of 1,4-dimethoxybenzene followed by reduction of the nitro groups to amines using the published procedure of Wu, et al. *Journal of Organic Chemistry.* 2007, 72, 2897) were added to vigorously stirred trifluoroacetic acid (10 mL). After 48 hours of stirring at 20° C., water (75 mL) was added to the reaction mixture and the pH increased to 9 by the dropwise addition of 1M aqueous sodium hydroxide solution. The precipitate was collected by filtration, dried in air and then washed repeatedly with tetrahydrofuran. The crude polymer was heated overnight in a mixture of acetone and methanol (1:1), collected by filtration and dried in a vacuum oven at 50° C. to give an off-white solid, which was insoluble in common organic solvents (1.22 g, 91% Yield).

EXAMPLE 6

The method of the present invention may be illustrated using a monomer comprising a single aromatic moiety provided with two amino groups. Briefly, 2,5-dimethyl-1,4-phenylenediamine is mixed under acidic conditions with paraformaldehyde to form polymer 6 in accordance with reaction scheme 6.

Reaction scheme 6

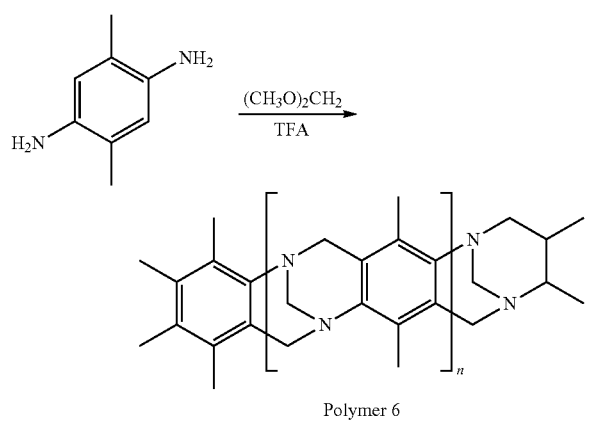

Polymer 6

2,5-dimethyl-1,4-phenylenediamine (2.00 g, 14.68 mmol, Aldrich) and dimethoxymethane (5.85 mL, 22.03 mmol, 4.5 equivalents; Aldrich) were added under vigorous stirring to trifluoroacetic acid (30 mL), which had been cooled to 0° C. The reaction was left under stirring at 20° C., for 7 days, then water (200 mL) was added to the reaction mixture and the pH increased to 9 by the dropwise addition of 1M aqueous sodium hydroxide solution. The precipitate was collected by filtration, dried in air and then washed repeatedly with tetrahydrofuran. The crude polymer was heated overnight in a mixture of acetone and methanol (1:1), collected by filtration and dried in a vacuum oven at 50° C. to give an off-white solid (2.78 g, 95% based on the repeated unit). BET surface area=677 m'/g; total pore volume=0.4873 mL/g; TGA analysis (nitrogen): weight loss due to thermal degradation started at 304° C. Molecular mass: (Gel Permeation Chromatrography, eluent=chloroform, against polystyrene standards: $M_n$=3,500; $M_w$=6,500; $^1$H NMR (400 MHz; d-chloroform) δ 4.31 (br m, 2H), 4.09 (br m, 2H), 3.79 (br m, 2H), 2.15 (br s, 3H), 1.79 (br s, 3H); IR (NaCl) cm$^{-1}$: 3372, 2944, 2883, 1671, 1614, 1463, 1403, 1374, 1356, 1337, 1299, 1267, 1243, 1220, 1169, 1101.

EXAMPLE 7

The method of the present invention may be illustrated using a monomer comprising two aromatic moieties each provided with an amino group. Briefly, 4,4'-(hexafluoroisopropylidene)dianiline is mixed under acidic conditions with paraformaldehyde to form polymer 7 in accordance with reaction scheme 7.

Reaction scheme 7

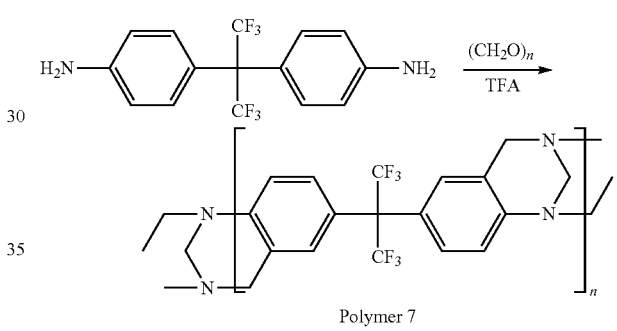

Polymer 7

Paraformaldehyde (351 mg, 4 equivalents; Aldrich) and 4,4'-(hexafluoroisopropylidene)dianiline (1.00 g, 5.94 mmol; 1 equivalent; Aldrich) were added to vigorously stirred trifluoroacetic acid (10 mL). After 48 hours of stirring at 20° C., water (75 mL) was added to the reaction mixture and the pH increased to 9 by the dropwise addition of 1M aqueous sodium hydroxide solution. The precipitate was collected by filtration, dried in air and then washed repeatedly with tetrahydrofuran. The crude polymer was heated overnight in a mixture of acetone and methanol (1:1), collected by filtration and dried in a vacuum oven at 50° C. to give an off-white solid, which was partially soluble in chloroform (1.09 g, 94% Yield). $^1$H NMR (400 MHz; d-chloroform) δ 7.07 (br m, 6H), 4.93 (br s, 2H), 4.62 (br s, 2H), 4.20 (br s, 2H).

EXAMPLE 8

The method of the present invention may be illustrated using a monomer comprising three aromatic moieties two of which are provided with an amino group. Briefly, 2,6(7)-diaminotriptycene is mixed under acidic conditions with dimethoxymethane to form polymer 8 in accordance with reaction scheme 8.

Reaction scheme 8

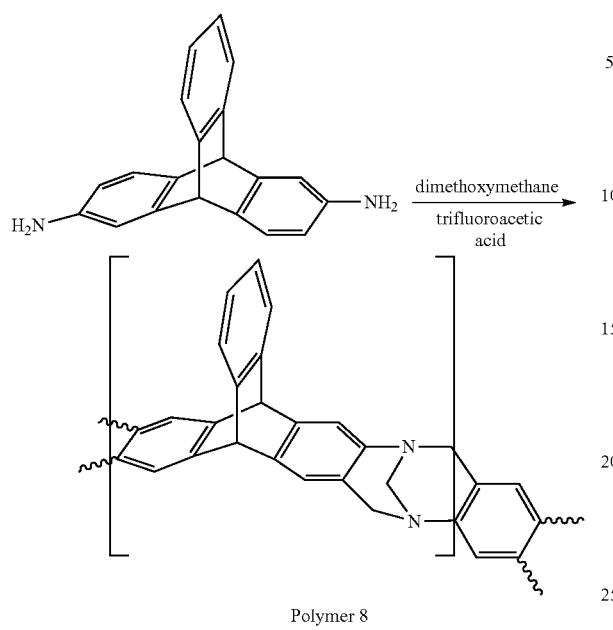

Polymer 8
(note that the 2,6-substituted isomer of diaminotriptycene is illustrated)

Reaction scheme 9

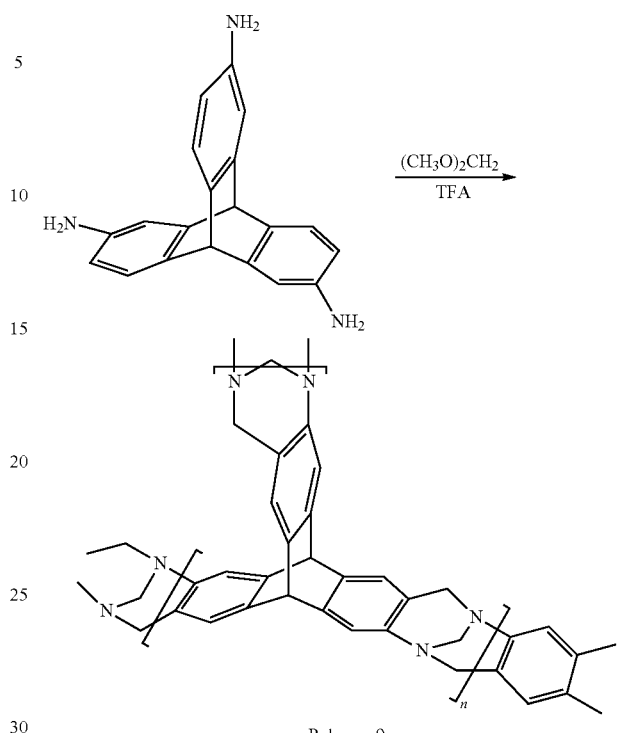

Polymer 9
(note that the 2,6,10-substituted isomer of triaminotriptycene is illustrated)

Dimethoxymethane (4.38 mL, 49.47 mmol, 5 equivalents; Aldrich) was added dropwise to a vigorously stirred solution of 2,6(7)-diaminotriptycene (2.81 g; 1 equivalent prepared by the nitration of triptycene followed by reduction as described by Chong et al. *Inorganic Chemistry*, 2006, 45, 1442) in trifluoroacetic acid (25 mL). After 16 hours of stirring at 20° C., water (100 mL) was added to the reaction mixture and the pH increased to 9 by the dropwise addition of 1M aqueous sodium hydroxide solution. The precipitate was collected by filtration. The crude polymer was dissolved in chloroform (50 mL) and reprecipitated with hexane (300 mL). The solid was collected by filtration and dried in a vacuum oven at 50° C. to give a cream powder (2.52 g, 79.6% based on repeating unit). BET surface area=740 m$^2$/g; total pore volume=0.5124 mL/g; TGA analysis (nitrogen): weight loss due to thermal degradation started at 400° C.; GPC analysis (based on polystyrene standard) Mw=50,000, Mn=21,000; $^1$H NMR (400 MHz, CDCl$_3$) δ 6.97 (br m, 8H), 5.07 (br s, 2H), 4.80 (br s, 2H), 4.41 (br s, 2H), 3.89 (br s, 2H); IR (NaCl) cm$^{-1}$: 3005, 2953, 1572, 1463, 1420, 1338, 1213, 934, 840, 748.

2,7,14-Triaminotriptycene (0.85 g, 2.84 mmol, 1 equivalent prepared by the nitration of triptycene followed by reduction as described by Chong et al. *Inorganic Chemistry*, 2006, 45, 144) was added to trifluoroacetic acid (10 mL) with vigorous stirring at 0° C. To this solution dimethoxymethane (1.76 mL, 19.90 mmol) was added dropwise and the mixture left stirring for 48 hours. The reaction was quenched with water (100 mL), stirred briefly then aqueous ammonia (35%, 100 mL) was added. The mixture was stirred vigorously for 24 hours before the solid was filtered off under suction. The polymer was refluxed in acetone for 16 hours, filtered, refluxed in THF for 16 hours, filtered refluxed in methanol for 16 hours and finally filtered. This gave the product as a brown powder (735 mg, 69.2% based on repeating unit). BET surface area=1035 m$^2$/g; total pore volume=0.6288 mL/g; TGA analysis (nitrogen): weight loss due to thermal degradation started at 423° C.

EXAMPLE 9

The method of the present invention may be illustrated using a monomer comprising three aromatic moieties each provided with an amino group. Briefly, 2,6(7),10(11)-triaminotriptycene is mixed under acidic conditions with dimethoxymethane to form a network polymer 9 in accordance with reaction scheme 9.

EXAMPLE 10

The method of the present invention may be illustrated using a monomer, comprising four aromatic moieties two of which are provided with an amino group. Briefly, 9,9'-spirobisfluorene-2,2'-diamine is mixed under acidic conditions with dimethoxymethane to form polymer 10 in accordance with reaction scheme 10.

Reaction scheme 10

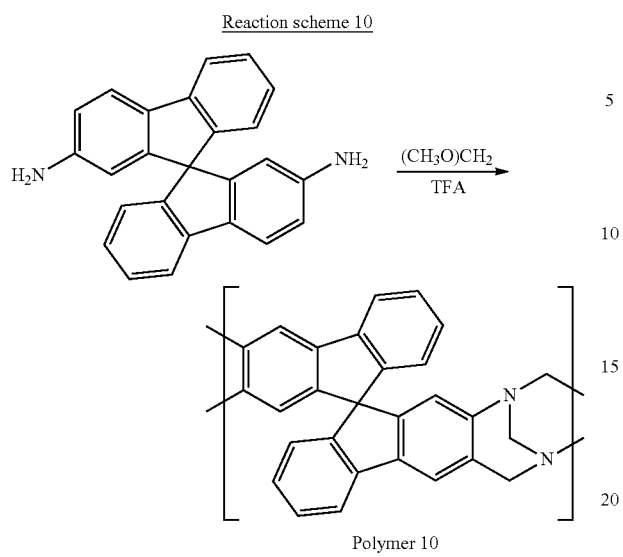

Polymer 10

Reaction scheme 11

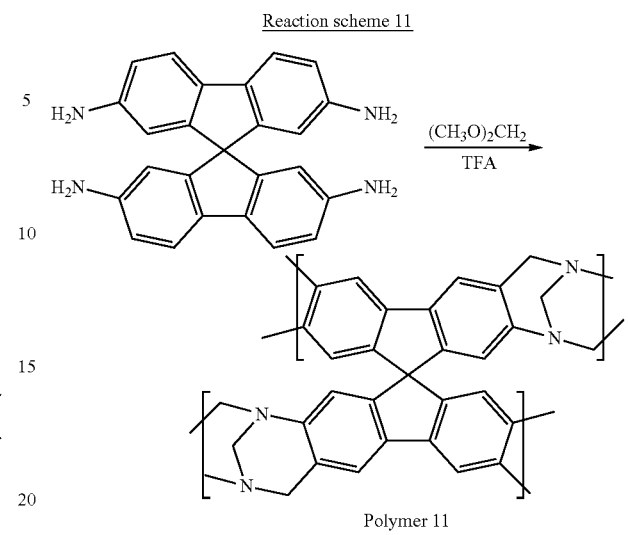

Polymer 11

Dimethoxymethane (0.53 mL, 3 equivalents; Aldrich) and 9,9'-spirobisfluorene-2,2'-diamine (700 mg, 2.02 mmol; 1 equivalent; made in two steps from the nitration of 9,9'-spirobisfluorene followed by reduction of the nitro groups to amines using the published procedure of Weber, et al. *Macromolecular Rapid Communications.* 2007, 28, 1871.) were added to vigorously stirred trifluoroacetic acid (20 mL) and chloroform (5 mL). After 96 hours of stirring at 20° C., water (100 mL) was added to the reaction mixture and the pH increased to 9 by the dropwise addition of 1M aqueous sodium hydroxide solution. The precipitate was collected by filtration, dried in air and then washed repeatedly with acetone. The crude polymer was dissolved in chloroform (50 mL), reprecipitated with hexane (300 mL), collected by filtration and dried in a vacuum oven at 50° C. to give an off-white solid, which was partially soluble in common organic solvents (735 mg, 90% Yield). BET surface area=566 $m^2$/g; total pore volume=0.3680 mL/g; Molecular mass of soluble fraction: (Gel Permeation Chromatography, eluent=chloroform, against polystyrene standards): $M_n$=15,000; $M_w$=30000. $^1$H NMR (400 MHz; d-chloroform) δ d 7.60 (br m, 4H), 7.30 (br m, 2H), 6.96 (br m, 2H), 6.43 (br m, 4H), 4.62 (br s, 2H), 4.25 (br s, 2H), 3.82 (br s, 2H); TGA analysis (nitrogen): 5% loss of weight occurred at below 275° C. Initial weight loss due to thermal degradation commences at ~350° C.

EXAMPLE 11

The method of the present invention may be illustrated using a monomer, comprising four aromatic moieties all of them are provided with an amino group. Briefly, 9,9'-spirobisfluorene-2,2',7,7'-tetramine is mixed under acidic conditions with dimethoxymethane to form polymer 11 in accordance with reaction scheme 11.

Dimethoxymethane (1.08 mL, 10 equivalents; Aldrich) and 9,9'-spirobisfluorene-2,2',7,7'-tetramine (460 mg, 1.22 mmol; 1 equivalent; made in two steps from the nitration of 9,9'-spirobisfluorene followed by reduction of the nitro groups to amines using the published procedure of Weber, et al. *Macromolecular. Rapid Communications.* 2007, 28, 1871.) were added to vigorously stirred trifluoroacetic acid (15 mL).

After 96 hours of stirring at 20° C., water (100 mL) was added to the reaction mixture and the pH increased to 9 by the dropwise addition of 1M aqueous sodium hydroxide solution. The precipitate was collected by filtration, dried in air and then washed repeatedly with tetrahydrofuran. The crude polymer was heated overnight in a mixture of acetone and methanol (1:1), collected by filtration and dried in a vacuum oven at 50° C. to give an off-white solid (595 mg, 95% Yield). BET surface area=585 $m^2$/g; total pore volume=0.3680 mL/g; TGA analysis (nitrogen): 5% loss of weight occurred at ~300° C. Initial weight loss due to thermal degradation commences at ~420° C.

EXAMPLE 12

The method of the present invention may be illustrated using a monomer comprising four aromatic moieties two of which are provided with amino groups. Briefly, 4,4'-(9-fluorenylidene)dianiline is mixed under acidic conditions with paraformaldehyde to form polymer 12 in accordance with reaction scheme 12.

Reaction scheme 12

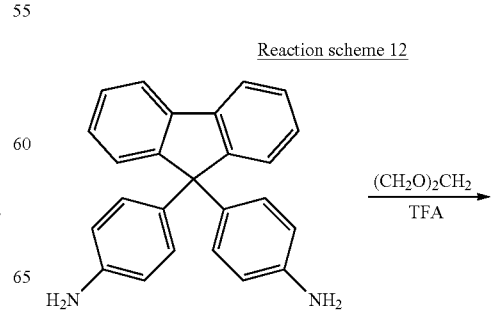

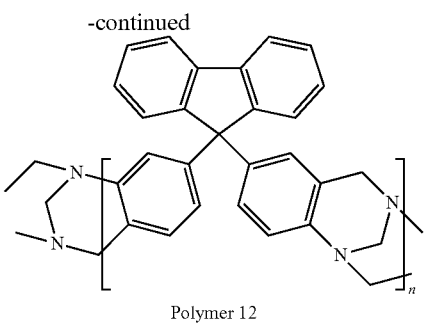

Polymer 12

Paraformaldehyde (688 mg, 4 equivalents; Aldrich) and 4,4'-(9-fluorenylidene)dianiline (2.00 g, 5.73 mmol; 1 equivalent; Aldrich) were added to vigorously stirred trifluoroacetic acid (10 mL). After 48 hours of stirring at 20° C., water (100 mL) was added to the reaction mixture and the pH increased to 9 by the dropwise addition of 1M aqueous sodium hydroxide solution. The precipitate was collected by filtration, dried in air and then washed repeatedly with tetrahydrofuran. The crude polymer was heated overnight in a mixture of acetone and methanol (1:1), collected by filtration and dried in a vacuum oven at 50° C. to give an off-white solid, which was partially soluble in chloroform (2.08 g, 95% Yield). $^1$H NMR (400 MHz; d-chloroform) δ 7.72 (br s, 3H), 7.34 (br s, 4H), 6.95 (br s 4H), 6.51 (br s, 3H), 4.46 (br m, 2H), 4.12 (br s, 2H), 3.88 (br s, 2H). Molecular mass of soluble fraction: (Gel Permeation Chromatography, eluent=chloroform, against polystyrene standards): $M_n$=7,200; $M_w$=16,100.

EXAMPLE 13

The method of the present invention may be illustrated using a monomer, comprising four aromatic moieties two of which are provided with an amino group. Briefly, 3,3,3',3'-tetramethyl-8,8'-diamino-2,2',3,3'-tetrahydro-1,1'-spirobi[cyclopenta[b]dibenzo[b,e][1,4]dioxine] is mixed under acidic conditions with paraformaldehyde to form polymer 13 in accordance with reaction scheme 13.

Paraformaldehyde (185 mg, 4 equivalents, Aldrich) and 3,3,3',3'-tetramethyl-8,8'-diamino-2,2',3,3'-tetrahydro-1,1'-spirobi[cyclopenta[b]dibenzo[b,e][1,4]dioxine] (800 mg, 1.54 mmol; 1 equivalent), prepared by the reaction of 5,5',6,6'-tetrahydroxy-3,3,3',3'-tetramethyl-1,1'-spirobisindane with 3,4-difluoronitrobenzene followed by the reduction of the nitro group, were added to vigorously stirred trifluoroacetic acid (10 mL). After 48 hours of stirring at 20° C., water (75 mL) was added to the reaction mixture and the pH increased to 9 by the dropwise addition of 1M aqueous sodium hydroxide solution. The precipitate was collected by filtration, dried in air and then washed repeatedly with tetrahydrofuran. The crude polymer was heated overnight in a mixture of acetone and methanol (1:1), collected by filtration and dried in a vacuum oven at 50° C. to give an off-white solid, which was partially soluble in chloroform (767 mg, 90% Yield). $^1$H NMR (400 MHz; d-chloroform) δ 6.82 (br m, 4H), 6.60 (br s, 4H), 6.30 (br s, 4H), 4.50 (br s, 2H), 4.20 (br s, 2H), 3.94 (br s, 2H), 2.26 (br s, 2H), 2.13 (br s, 2H), 1.25 (br m, 12H). BET surface area=628 m$^2$/g; total pore volume=0.44 cm$^3$/g at ($P/P_0$) 0.98, adsorption; TGA analysis (nitrogen): 5% loss of weight occurred at ~380° C. Initial weight loss due to thermal degradation commences at ~465° C.

EXAMPLE 14

The method of the present invention may be illustrated using a monomer comprising a single spirobisindane moiety provided with two amino groups. Briefly, 3,3,3',3'-tetramethyl-1,1-spirobisindane-6,6'-diamine, prepared from 3,3,3',3'-tetramethyl-1,1-spirobisindane (L. R. C. Barclay and R. A. Chapman, *Can. J. Chem.*, 1964, 42, 25) by nitration and reduction of the nitro groups, is mixed under acidic conditions with dimethoxymethane to form polymer 14 in accordance with reaction scheme 14.

Reaction scheme 13

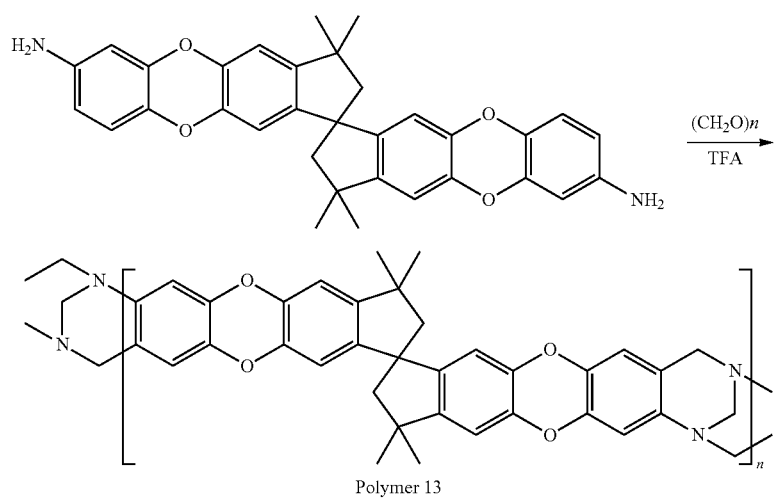

Polymer 13

Reaction scheme 14

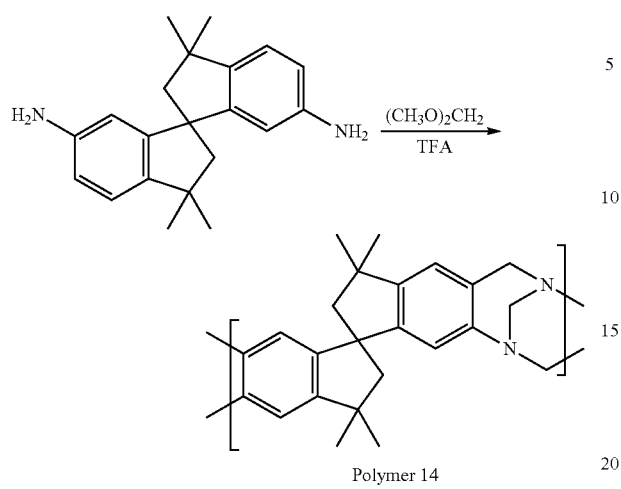

Polymer 14

Dimethoxymethane (0.70 mL, 10 equivalents; Aldrich) is added to a vigorously stirred solution of 3,3,3',3'-tetramethyl-1,1'-spirobisindane-6,6'-diamine (580 mg, 1.89 mmol, 1 equivalent) in trifluoroacetic acid (5.80 mL). After 48 h of stirring at 20° C. the reaction mixture is poured into water (100 mL) and the pH of the aqueous mixture is increased to 9 by the dropwise addition of ammonia solution. The precipitate is collected by filtration, dried in air and then dissolved in $CHCl_3$, filtered through cotton and reprecipitated into hexane. The polymer is dried in a vacuum oven at 120° C. to give a pale yellow solid (80% yield after the second precipitation). $^1$H NMR (400 MHz; d-$CDCl_3$) δ ppm: 6.71 (br m, 4H), 4.49 (br m, 6H), 2.23 (br m, 4H), 1.30 (br m, 12H). Molecular mass of soluble fraction: (Gel Permeation Chromatography, eluent=chloroform, against polystyrene standards): $M_n$=18,500 Mw=48,800. BET surface area=745 m$^2$/g; total pore volume=0.54 cm$^3$/g at (P/$P_0$) 0.98, adsorption; TGA analysis (nitrogen): Initial weight loss due to thermal degradation commences at =435° C.

EXAMPLE 15

The method of the present invention may be illustrated using a monomer comprising two aromatic moieties provided with two amino groups. Briefly, 5-amino-1-(4-aminophenyl)-1,3,3-trimethylindane is mixed under acidic conditions with dimethoxymethane to form polymer 15 in accordance with reaction scheme 15.

Reaction scheme 15

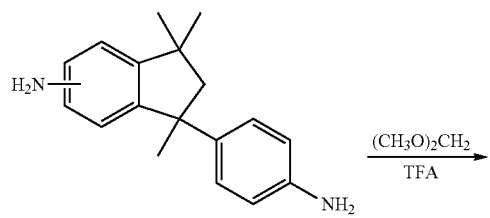

Polymer 15

Under a nitrogen atmosphere, 5-amino-1-(4-aminophenyl)-1,3,3-trimethylindane (1.0 g, 3.75 mmol; I. V. Farr, D. Kratzner, T. E. Glass, D. Dunson, Q. Ji and J. E. McGrath, *J. Polym. Sci., Part A: Polym. Chem.*, 2000, 38, 2840-2854) was dissolved in trifluoroacetic acid (10 mL) with cooling in an ice bath. Dimethoxymethane (1.33 mL, 15 mmol, 4 equivalents; Aldrich) was added drop-wise and the mixture was stirred for 72 h at 20° C. the reaction mixture is poured into water (100 mL) and the pH of the aqueous mixture is increased to 9 by the dropwise addition of ammonia solution. The precipitate is collected by filtration, dried in air and then dissolved in $CHCl_3$, filtered through cotton and reprecipitated into hexane to afford the desired polymer (0.76 g, 67% based on the repeated unit) as a white powder. $^1$H NMR (500 MHz; $CDCl_3$) δ 6.70 (br m, 5H), 4.49 (br s, 2H), 4.05 (br s, 4H), 2.57 (br s, 1H), 2.11 (br, s, 1H), 1.34 (br s, 3H), 1.05 (br s, 3H), 0.81 (br s, 3H). Molecular mass:(Gel Permeation Chromatography, eluent=chloroform, against polystyrene standards: $M_n$=38,800; $M_w$=45,200. BET surface area=535 m$^2$/g; total pore volume=0.61 cm$^3$/g at (P/$P_0$)=0.9814, adsorption; TGA analysis (nitrogen): Initial weight loss due to thermal degradation commences at ~350° C.

EXAMPLE 16

The method of the present invention may be illustrated using a monomer comprising two aromatic moieties provided with two amino groups. Briefly, 9,10-dimethyl-9,10-dihydro-2(3),6(7)-diamino-9,10-ethanoanthracene prepared from the hydrocarbon (L. R. Barclay and R. A. Chapman, *Can. J. Chem.*, 1965, 43, 1754) by nitration and reduction of the nitro groups, is mixed under acidic conditions with dimethoxymethane to form polymer 16 in accordance with reaction scheme 16.

Reaction scheme 16

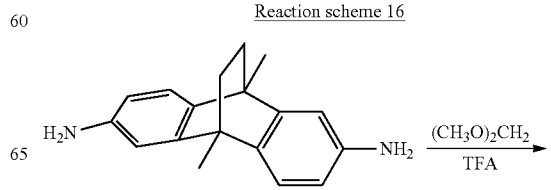

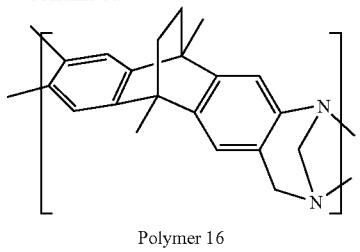

Polymer 16

Under a nitrogen atmosphere, 9,10-dimethyl-9,10-dihydro-2(3),6(7)-diamino-9,10-ethanoanthracene (1 g, 3.78 mmol;) was dissolved in trifluoroacetic acid (10 mL) with cooling in an ice bath. Dimethoxymethane (1.67 mL, 18.9 mmol, 5 equivalents; Aldrich) was added drop-wise and the mixture was stirred for 72 h at 20° C. the reaction mixture is poured into water (100 mL) and the pH of the aqueous mixture is increased to 9 by the dropwise addition of ammonia solution. The precipitate is collected by filtration, dried in air and then dissolved in $CHCl_3$, filtered through cotton and reprecipitated into hexane to afford the desired polymer desired polymer (0.93 g, 82% based on the repeated unit) as a white powder. $^1$H NMR (500 MHz; $CDCl_3$) δ 7.27 (br, m, 4H), 4.56 (br s, 2H), 4.05 (br s, 4H), 1.81 (br, m, 6H), 1.65 (br, m, 4H). Molecular mass: (Gel Permeation Chromatography, eluent=chloroform, against polystyrene standards: $M_n$=27,170; $M_w$=69,020. BET surface area=880 m2/g; total pore volume=0.7161 cm$^3$/g at $(P/P_0)$=0.9814, adsorption; TGA analysis (nitrogen): A 3.2% loss of weight occurred at ~20° C. Initial weight loss due to thermal degradation commences at ~261.61° C.

EXAMPLE 17

The method of the present invention may be illustrated using a monomer comprising a single diaminodibenzo-18-crown-6 moiety provided with two amino groups. Briefly, diaminodibenzo-18-crown-6 is mixed under acidic conditions with dimethoxymethane to form polymer 16 in accordance with reaction scheme 17.

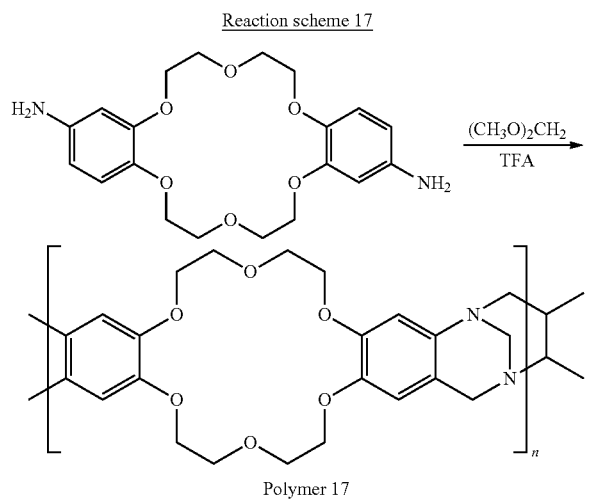

Reaction scheme 17

Polymer 17

Diaminodibenzo-18-crown-6 (750 mg, 1.92 mmol, made from the nitration of the commercial dibenzo-18-crown-6 (Aldrich), followed by reduction of the nitro groups to amines) was dissolved in a mixture of trifluoroacetic acid (10 mL) and chloroform (10 mL) cooled to 0° C. Once dissolved, dimethoxymethane (0.51 mL, 5.77 mmol; Aldrich) was added and the mixture was stirred for 72 h at 20° C. The reaction was quenched in a mixture of ice water (100 mL) and aqueous ammonia (35%, 50 mL). The mixture was stirred for 2 hours before the yellow precipitate was filtered off. The precipitate was finely ground before it was refluxed in acetone overnight. Final filtration gave the polymer as a yellow powder (396 rug, 0.93 mmol based on repeating unit, 48.4%). $^1$H NMR (400 MHz, $CDCl_3$) δ ppm 6.46 (br s, 2H), 4.46 (br s, 2H), 3.98 (br s, 20H); TGA analysis (nitrogen): weight loss due to thermal degradation started at 202° C.

EXAMPLE 18

The method of the present invention may be illustrated using a monomer comprising a single naphthalene moiety provided with two amino groups. Briefly, 1,5-diaminonapthalene is mixed under acidic conditions with dimethoxymethane to form polymer 18 in accordance with reaction scheme 18.

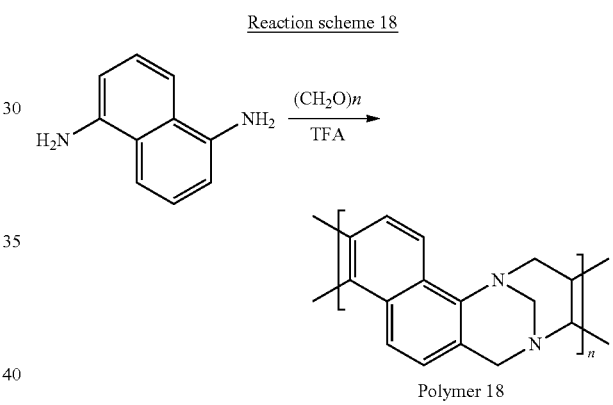

Reaction scheme 18

Polymer 18

1,5-diaminonapthalene (1.00 g, 6.32 mmol; Aldrich) was mixed with paraformaldehyde (0.95 g, 31.60 mL) and the mixture slowly added to trifluoroacetic acid (10 mL) cooled to 0° C. The mixture was stirred for 72 h at 20° C. then was quenched in a mixture of ice water (100 mL) and aqueous ammonia (35%, 50 mL). This mixture was stirred for 2 hours before the yellow precipitate was filtered off. The precipitate was finely ground before it was refluxed in acetone overnight. The solid was then refluxed in THF for 2 hours, filtered off and refluxed in acetone for 2 hours before filtration and reflux in methanol for 16 hours. Finally the powder was filtered off to obtain the polymer as a cream coloured powder partly soluble in chloroform (848 mg, 69% based on repeating unit). $^1$H NMR (400 MHz, $CDCl_3$) δ 8.03 (br s, 2H), 7.04 (br s, 2H), 4.90 (br s, 2H), 4.55 (br s, 2H), 4.30 (br s, 2H). BET surface area=700 m$^2$/g; total pore volume=0.3215 mL/g; TGA analysis (nitrogen): weight loss due to thermal degradation started at 400° C.

EXAMPLE 19

The method of the present invention may be illustrated using a monomer comprising a single 1,1'-cyclohexane-1,1- diyldibenzene moiety provided with two amino groups. Briefly, 1,1-bis(3'-methyl-4'-aminophenyl)cyclohexane is mixed under acidic conditions with dimethoxymethane to form polymer 19 in accordance with reaction scheme 19.

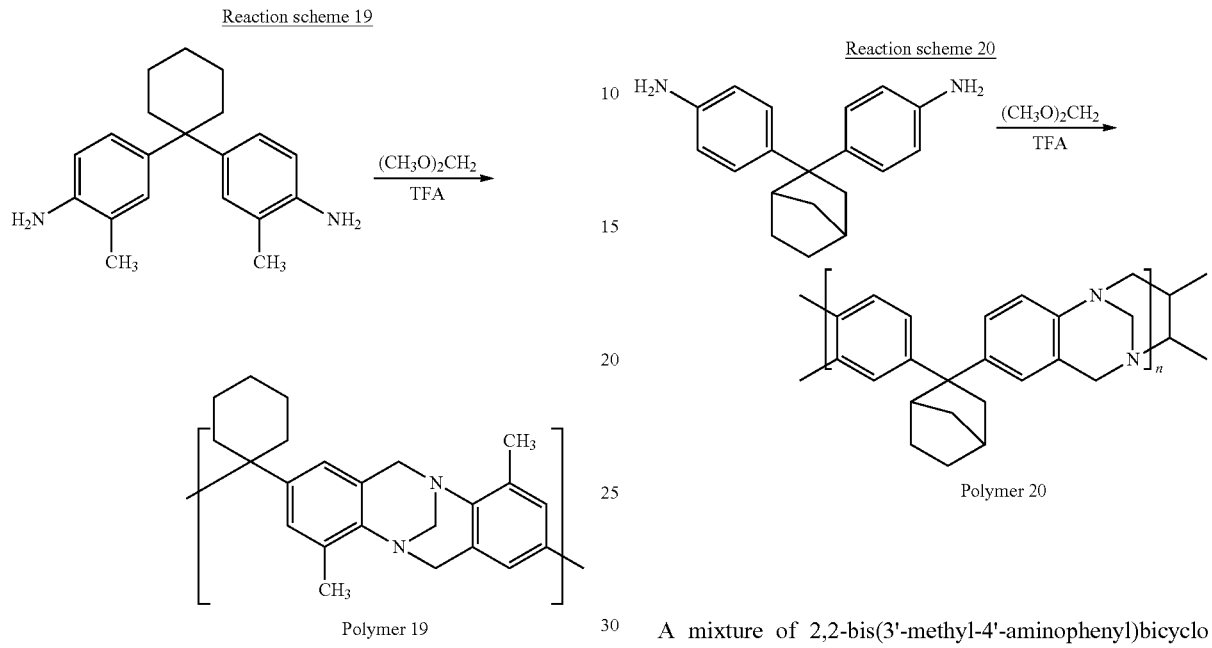

A mixture of 1,1-bis(3'-methyl-4'-aminophenyl)cyclohexane (2.00 g, 6.80 mmol, 1 eq, made in one step following the procedure of Zhang et al. Macromolecules 2003, 36, 5559) and dimethoxymethane (3.00 mL, 34.01 mmol, 5 equivalents, Aldrich) was added under vigorous stirring to trifluoroacetic acid (20 mL). After 7 days of stirring at 20° C., water (100 mL) was added to the reaction mixture and the pH increased to 9 by the dropwise addition of 1M aqueous sodium hydroxide solution. The precipitate was collected by filtration, dried in air and then washed repeatedly with tetrahydrofuran. The polymer was dissolved in chloroform (50 mL), reprecipitated with hexane (300 mL) and the solid filtered off, dried in a vacuum oven at 50° C. obtaining the polymer as a cream powder (1.80 g, 87.6% based on repeating unit). Molecular mass: (Gel Permeation Chromatography, eluent=chloroform, against polystyrene standards: $M_n$=44,296; $M_w$=119,000. BET surface area=30.3 m$^2$/g; total pore volume=0.0864 mL/g; TGA Initial weight loss due to thermal degradation commences at ~332° C. $^1$H NMR (400 MHz, CDCl$_3$) δ 6.63 (br s, 2H), 4.48 (br m, 2H), 4.22 (br s, 2H), 3.90 (br m, 2H), 2.32 (br s, 6H), 2.10 (br s, 4H), 1.43 (br s, 6H); IR (NaCl) cm$^{-1}$: 2937, 2859, 2252, 1661, 1478, 1452, 1354, 1327, 1217, 1173, 1115, 1071.

EXAMPLE 20

The method of the present invention may be illustrated using a monomer comprising a single 2,2-diphenylbicyclo[2.2.1]heptane moiety provided with two amino groups. Briefly, 2,2-bis(3'-methyl-4'-aminophenyl)bicyclo[2.2.1]heptane is mixed under acidic conditions with dimethoxymethane to form polymer 20 in accordance with reaction scheme 20.

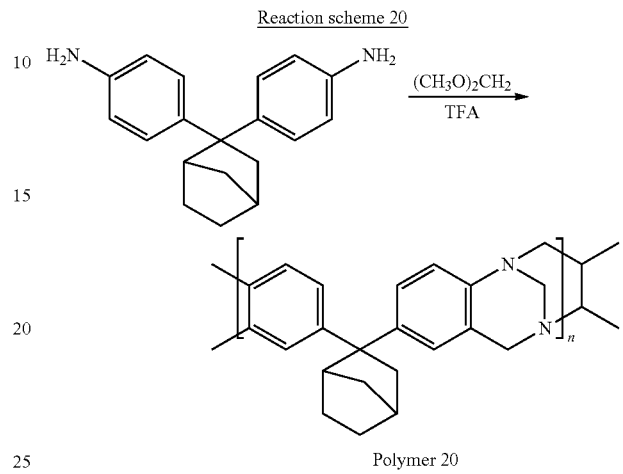

A mixture of 2,2-bis(3'-methyl-4'-aminophenyl)bicyclo[2.2.1]heptane (2.00 g, 6.54 mmol, made in one step adapting the procedure from a paper of Yi et al. Journal of Polymer Science Part A: Polymer Chemistry, 1999, 37, 3449) and dimethoxymethane (2.89 mL, 32.68 mmol, 5 equivalents, Aldrich) was added under vigorous stirring to trifluoroacetic acid (20 mL). After 7 days of stirring at 20° C., water (100 mL) was added to the reaction mixture and the pH increased to 9 by the dropwise addition of 1M aqueous sodium hydroxide solution. The precipitate was collected by filtration, dried in air and then washed repeatedly with tetrahydrofuran. The polymer was dissolved in chloroform (50 mL), reprecipitated with hexane (300 mL) and the solid filtered off, dried in a vacuum oven at 50° C. obtaining the polymer as a cream powder (947 mg, 42.3% based on repeating unit). Molecular mass: (Gel Permeation Chromatography, eluent=chloroform, against polystyrene standards: $M_n$=5,784; $M_w$=9,255. BET surface area=72 m$^2$/g; total pore volume=0.3655 mL/g; TGA Initial weight loss due to thermal degradation commences at ~350° C. $^1$H NMR (400 MHz, CDCl$_3$) δ 6.91 (br m, 2H), 6.69 (br m, 2H), 4.47 (br m, 2H), 4.17 (br s, 2H), 3.88 (br s, 2H), 3.03 (br s, 1H), 2.31 (br s, 6H), 2.08 (br m, 3H), 1.44 (br m, 3H), 1.15 (br m, 3H); IR (NaCl) cm$^-$: 2954, 2873, 2253, 1663, 1476, 1376, 1327, 1216, 1181.2, 1121.4.

EXAMPLE 21

The method of the present invention may be illustrated using a monomer comprising a single 2,2-bis(3'-methyl-4'-phenyl)adamantane moiety provided with two amino groups. Briefly, 2,2-bis(3'-methyl-4'-aminophenyl)adamantane is mixed under acidic conditions with dimethoxymethane to form polymer 21 in accordance with reaction scheme 21.

Reaction scheme 21

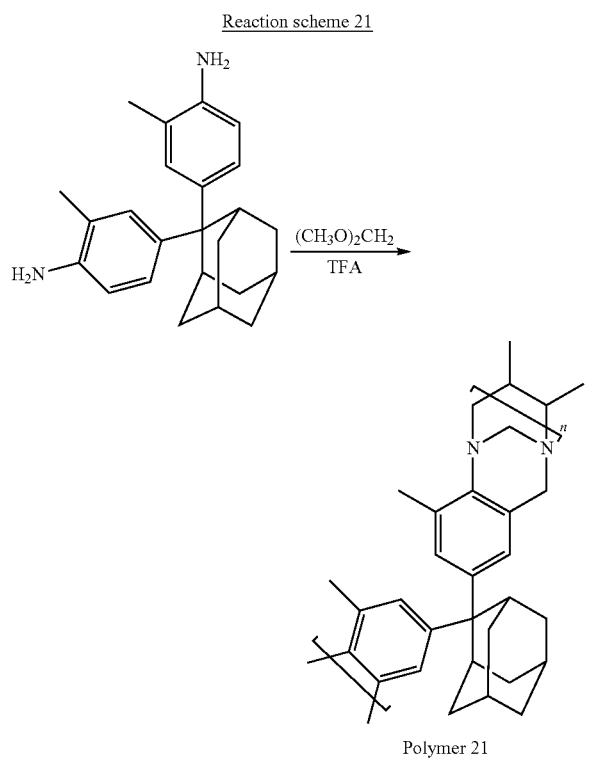

Polymer 21

A mixture of 2,2-bis(3-methyl-4-aminophenyl)adamantane (1.48 g, 4.27 mmol, made in one step adapting the procedure from a paper of Yi et al. Journal of Polymer Science Part A: Polymer Chemistry, 1999, 37, 3449) and dimethoxymethane (1.89 mL, 21.35 mmol, 5 equivalents, Aldrich) was added under vigorous stirring to trifluoroacetic acid (15 mL). After 7 days of stirring at 20° C., water (100 mL) was added to the reaction mixture and the pH increased to 9 by the dropwise addition of 1M aqueous sodium hydroxide solution. The precipitate was collected by filtration, dried in air and then washed repeatedly with tetrahydrofuran. The polymer was dissolved in chloroform (50 mL), reprecipitated with hexane (300 mL) and the solid filtered off, dried in a vacuum oven at 50° C. obtaining the polymer as a cream powder (681 mg, 41.7% based on repeating unit). $^1$H NMR (400 MHz, CDCl$_3$) δ 7.00 (br s, 2H), 6.74 (br s, 2H), 4.46 (br s, 2H), 4.13 (br m, 2H), 3.88 (br m, 2H), 3.03 (br s, 2H), 2.29 (br s, 6H), 1.91 (br s, 4H), 1.67 (br m, 8H). IR (NaCl) cm$^{-1}$: 2908, 2855, 2253, 1477, 1326, 1217, 1123. Molecular mass: (Gel Permeation Chromatography, eluent=chloroform, against polystyrene standards: $M_n$=11,950; $M_w$=19,900. BET surface area=523 m$^2$/g; total pore volume=0.3707 mL/g; TGA Initial weight loss due to thermal degradation commences at ~470° C. ° C.

EXAMPLE 22

The method of the present invention may be illustrated using a monomer comprising a single diphenylmethane moiety provided with two amino groups. Briefly, bis(3-methyl-4-aminophenyl)methane is mixed under acidic conditions with dimethoxymethane to form polymer 22 in accordance with reaction scheme 22.

Reaction scheme 22

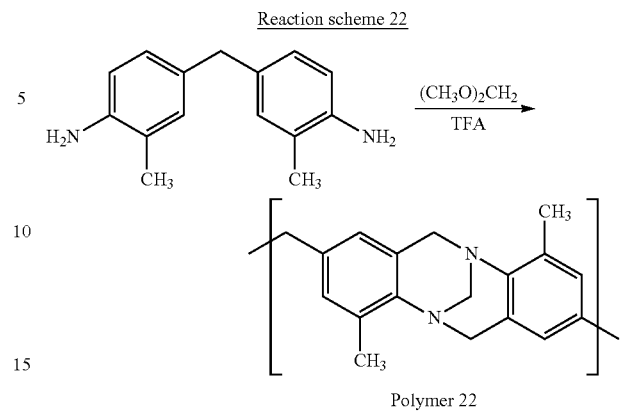

Polymer 22

Under a nitrogen atmosphere, bis(4-amino-3-methylphenyl)methane (1 g, 4.4 mmol, TCI Europe) was dissolved in trifluoroacetic acid (10 ml) with cooling in an ice bath. Dimethoxymethane (1.95 ml, 1.68 g, 22 mmol, 5 equivalents) was added drop-wise and the mixture was stirred for 4 days at room temperature. The mixture was quenched in water (100 ml) and basified with ammonium hydroxide solution with vigorous stirring over 24 h to form a light brown powder. The solid was filtered, washed with water and then acetone until washings were clear. The resulting off white powder was dissolved in chloroform (50 ml) and methanol was added until the solution became turbid. The solution was stirred for a further 30 min and the precipitated powder was filtered. The re-precipitation from chloroform was repeated twice again. The powder was dissolved in chloroform (50 ml) and added drop-wise to n-hexane (250 ml) and the precipitated fine powder was filtered. The off white powder was refluxed in acetone (24 h) and then in methanol (24 h). The material was then dried in a vacuum oven for 9 h to afford the desired polymer (0.63 g, 54% based on the repeated unit) as an off white powder. $^1$H NMR (500 MHz; CDCl$_3$) δ 6.81 (br, s, 2H, ArH), 6.58 (br, s, 2H, ArH), 4.54 (br, d, 16.53 Hz, 2H, N—CH$_2$—Ar), 4.29 (br, s, 2H, N—CH$_2$—N), 3.95 (br, d, $^1J_{HH}$=16.53 Hz, 2H, N—CH$_2$—Ar), 3.67 (br, s, 2H, Ph-CH$_2$-Ph), 2.37 (br, s, 6H, 2 CH$_3$). $^{13}$C NMR (126 MHz; CDCl$_3$) δ 144.21+136.40+132.91 (s, Ar-quaternary), 129.37 (s, ArC), 128.06 (s, quaternary ArC—CH$_3$), 124.52 (s, ArC), 67.53 (s, N—CH$_2$—N), 54.97 (s, N—CH$_2$—Ar), 41.07 (s, Ph-CH$_1$-Ph), 17.13 (s, CH$_2$). BET surface area=53.85 m$^2$/g; total pore volume=0.2234 cm$^3$/g at (P/P$_0$)=0.9814, adsorption; TGA analysis (nitrogen): A 0.89 loss of weight occurred at ~20° C. Initial weight loss due to thermal degradation commences at ~357° C. with a 45.46% loss of weight.

EXAMPLE 23

The method of the present invention may be illustrated using a monomer comprising three aromatic moieties two of which are provided with an amino group. Briefly, 1,4-bis-(4'-aminophenyl)-2,3,5,6-tetraphenylbenzene is mixed under acidic conditions with dimethoxymethane to form polymer 23 in accordance with reaction scheme 23.

Reaction scheme 23

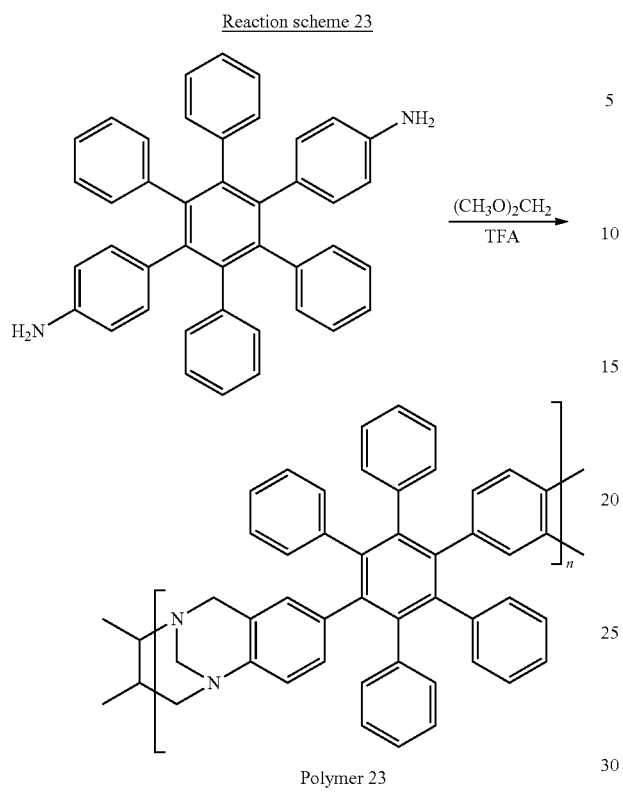

Polymer 23

Reaction scheme 24

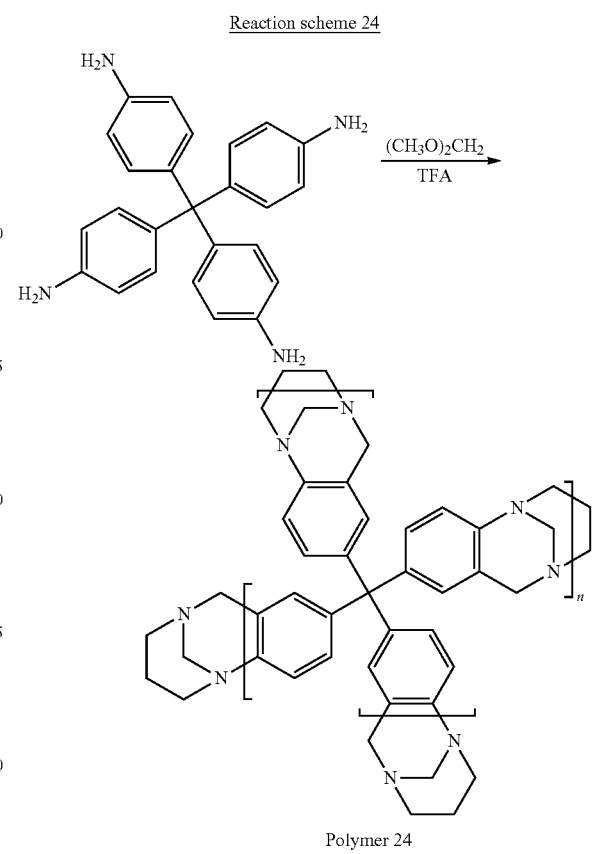

Polymer 24

Dimethoxymethane (0.35 mL, 49.47 mmol, 3.2 equivalents; Aldrich) was added dropwise to a vigorously stirred solution of 1,4-bis-(4'-aminophenyl)-2,3,5,6-tetraphenylbenzene (0.69 g; 1 equivalent prepared in three steps using the method of Sakaguchi et al. Polymer Journal, 1992, 24, 10, 1147) in trifluoroacetic acid (10 mL) and chloroform (5 mL). After 72 hours of stirring at 20° C., water (80 mL) was added to the reaction mixture and the pH increased to 9 by the dropwise addition of 1M aqueous sodium hydroxide solution. The precipitate was collected by filtration. The crude polymer was dissolved in chloroform (20 mL), reprecipitated with a mixture of acetone (100 mL) and methanol (100 mL). The polymer was collected by filtration and dried in a vacuum oven at 50° C. to give the polymer as a cream powder (585 mg, 77% based on repeating unit,). BET surface area=413 $M^2/g$; total pore volume=0.5885 mL/g; TGA analysis (nitrogen): weight loss due to thermal degradation started at 467° C.; $^1$H NMR (400 MHz, CDCl$_3$) δ 6.84 (br m, 10H), 6.71 (br m, 10H, 6.49 (br m, 4H), 6.18 (br m, 2H), 4.79 (br s, 2H), 4.04 (br s, 2H), 3.88 (br s, 2H).

EXAMPLE 24

The method of the present invention may be illustrated using a monomer comprising three aromatic moieties two of which are provided with an amino group. Briefly, tetra(4-aminophenyl)methane is mixed under acidic conditions with dimethoxymethane to form polymer 24 in accordance with reaction scheme 24.

Dimethoxymethane (1.87 mL, 21.15 mmol, 12 equivalents; Aldrich) was added dropwise to a vigorously stirred solution of tetra(p-aminophenyl)methane (0.670 g; 1 equivalent prepared in three steps using the method described in J. Am. Chem. Soc., 127, 42, 2005 14531) in trifluoroacetic acid (15 mL). After 4 days of stirring at 20° C., water (100 mL) was added to the reaction mixture and the pH increased to 9 by the dropwise addition of 1M aqueous sodium hydroxide solution. The precipitate was collected by filtration. The crude polymer was repeatedly refluxed and filtered off from THF (50 mL), CHCl$_3$ (50 mL), acetone (50 mL), and methanol (50 mL). The polymer was collected by filtration and dried in a vacuum oven at 50° C. to give the polymer as a cream powder (700 mg, 80% based on repeating unit). BET surface area=380 m$^2$/g; total pore volume=0.2577 mL/g; TGA analysis (nitrogen): weight loss due to thermal degradation started at 414° C.

EXAMPLE 25

The method of the present invention may be illustrated by the quaternisation reaction between the polymer of Example 8, formed by the reaction between 2,6(7)-diaminotriptycene with dimethoxymethane as shown in reaction scheme 8, and dimethyl sulphate in accordance with reaction scheme 25.

Reaction scheme 25.

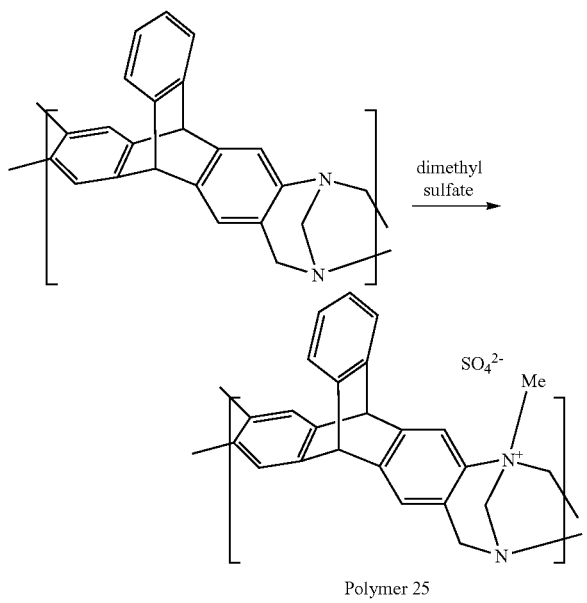

Polymer 25

The polymer described in Example 8 derived from diaminotriptycene and dimethoxymethane (100 mg, 0.28 mmol) was placed in acetonitrile (10 mL) and dimethyl sulfate (0.027 mL, 2.8 mmol) was added to the reaction mixture, which was stirred at 20° C. for 24 h. The reaction was quenched with water, the resulting precipitate was collected by filtration and washed with water to afford the desired compound as a grey powder (137 mg, 95% yield). $^1$H NMR (400 MHz; DMSO-d6) δ 8.91 (br s, 2H), 8.15 (br s, 1H), 7.12 (br s, 7H), 4.67 (br m, 6H), 3.56 (br s, 3H); TGA analysis (nitrogen): 14.4% loss of weight occurred at ~180° C. Further weight loss due to thermal degradation commences at ~270° C.

EXAMPLE 26

The method of the present invention may be illustrated by the quaternisation reaction between the polymer of Example 18, formed by the reaction between naphthalene-1,5-diamine with dimethoxymethane as shown in reaction scheme 18, and methyl iodide in accordance with reaction scheme 26.

Reaction scheme 26.

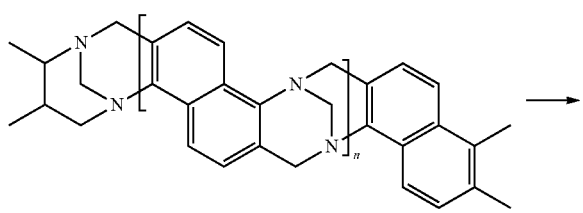

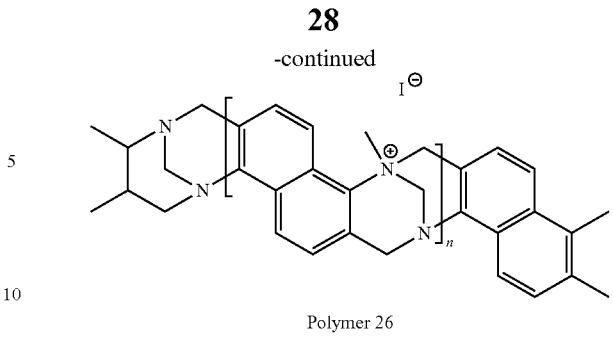

Polymer 26

The polymer described in example 18 (400 mg, 2.06 mmol based on repeating unit) was added to DMSO (20 mL). Methyl iodide (2.57 mL, 41.22 mmol) was added and the mixture stirred for 72 hours. During this time a colour change of the insoluble polymer from red to brown was observed. The reaction was quenched in water (100 mL) and the resulting mixture stirred for two hours. The polymer was washed with acetone and refluxed in methanol for 16 hours. The mixture was then filtered to give the product as a red brown powder (731 mg, 98.7%). $^1$H NMR (400 MHz, CDCl$_3$) δ 8.04 (br s, 2H), 7.04 (br s, 2H), 4.89 (br s, 3H), 4.57 (br s, 2H), 4.39 (br s, 2H), 4.27 (br s, 2H).

EXAMPLE 27

The method of the present invention may be illustrated by the quaternisation reaction between the polymer of Example 18, formed by the reaction between naphthalene-1,5-diamine with dimethoxymethane as shown in reaction scheme 18, and dimethyl sulphate in accordance with reaction scheme 27.

Reaction scheme 27.

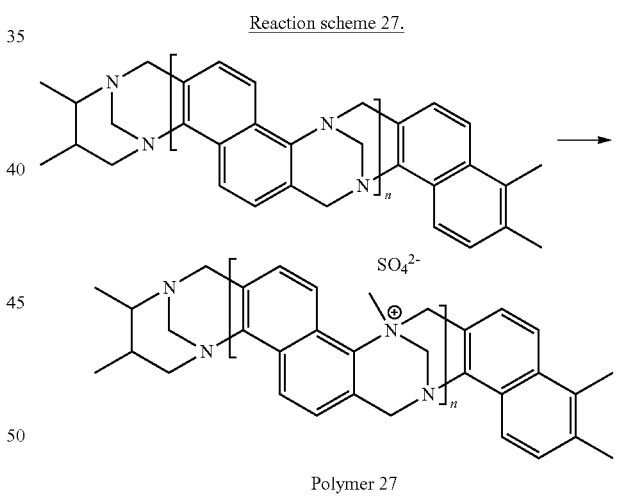

Polymer 27

The polymer described in example 18 (400 mg, 2.06 mmol based on repeating unit) was added to DMSO (20 mL). After the addition of dimethyl sulphate (3.91 mL, 41.22 mmol), the reaction was left stirring for 72 hours. During this time a colour change of the insoluble polymer from red to brown was observed. The reaction was quenched in water (100 mL) and the resulting mixture stirred for two hours. The polymer was washed with acetone and refluxed in methanol for 16 hours. The mixture was then filtered to give the product as a dark brown powder (662 mg, 2.01 mmol, 97.6%). TGA analysis (nitrogen): weight loss due to thermal degradation started at 184° C. $^1$H NMR (400 MHz, DMSO) δ 7.97 (br s, 2H), 7.13 (br m, 2H), 5.11 (br s, 3H), 4.90 (br s, 2H), 4.53 (br s, 2H), 4.26 (br m, 2H).

Further monomers which are considered to be appropriate to be used in the method of the present invention are shown below:
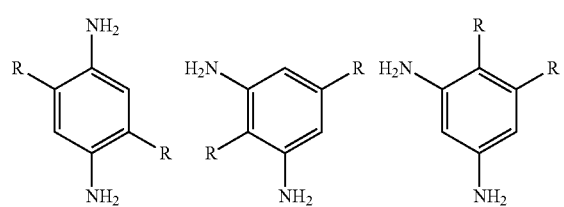
R = H, Me or OMe
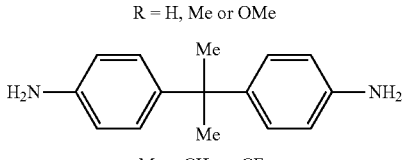
Me = CH₃ or CF₃
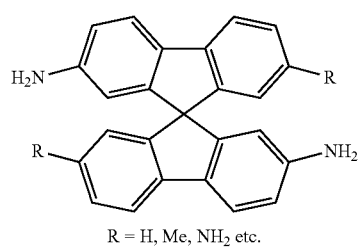
R = H, Me, NH₂ etc.
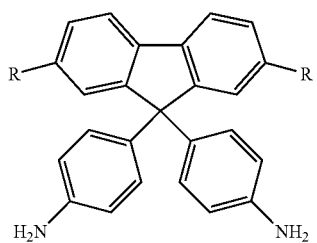
R = H, Me, NH₂ etc.
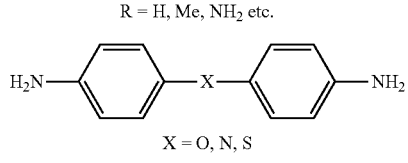
X = O, N, S
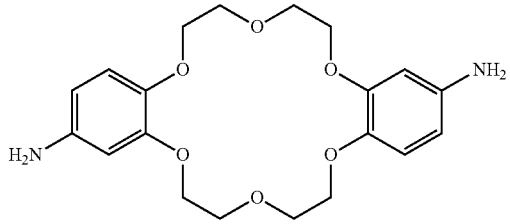
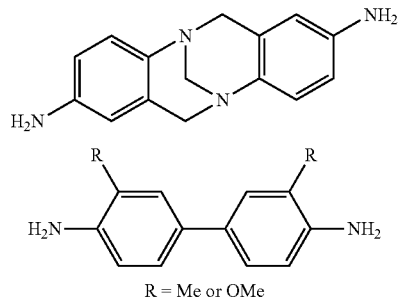
R = Me or OMe
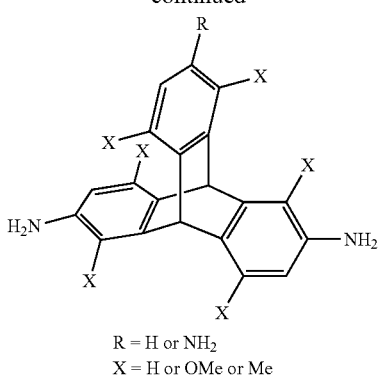
R = H or NH₂
X = H or OMe or Me
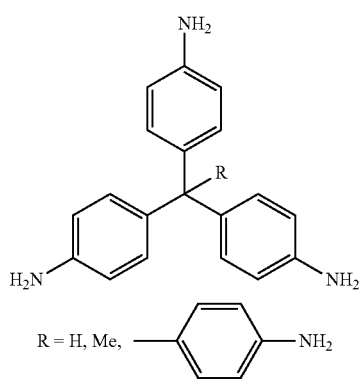
R = H, Me, —⟨phenyl⟩—NH₂
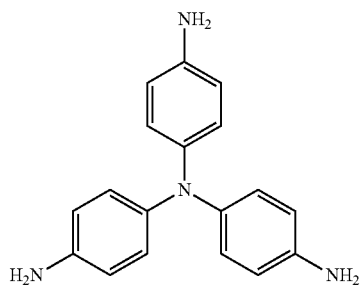
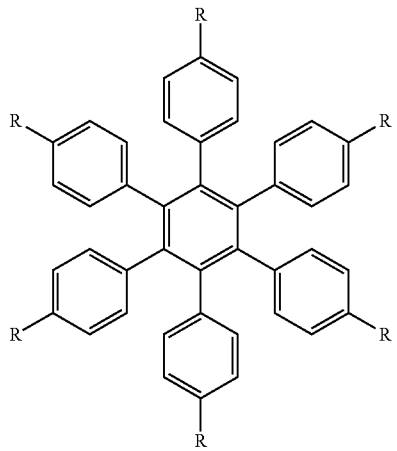
At least 2 × R = NH₂
Rest = H, Me, -continued

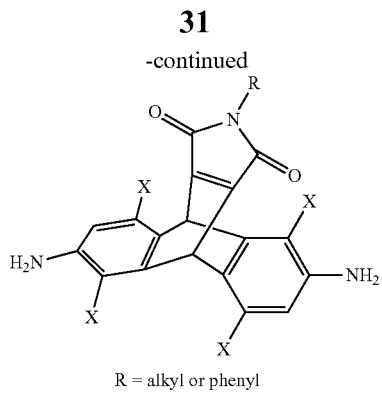

R = alkyl or phenyl
X = H or OMe or Me

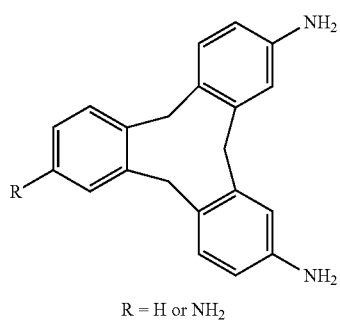

R = H or NH$_2$

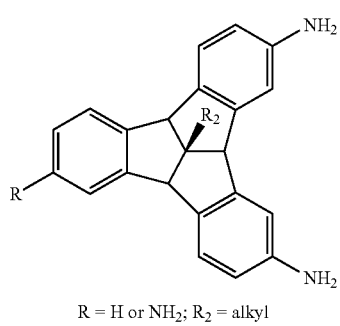

R = H or NH$_2$; R$_2$ = alkyl

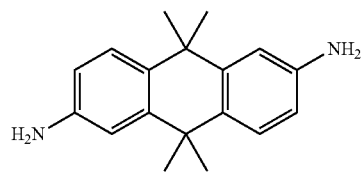

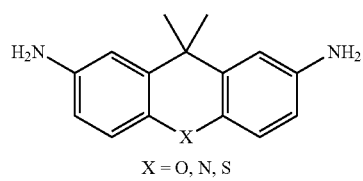

X = O, N, S

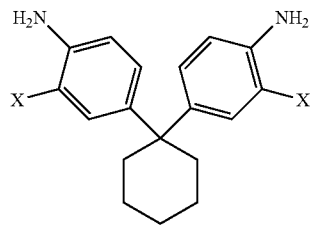

X = H or OMe or Me

-continued

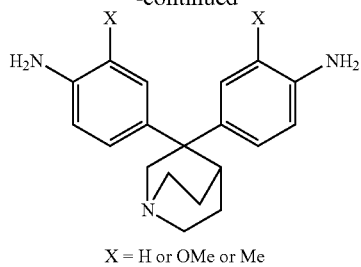

X = H or OMe or Me

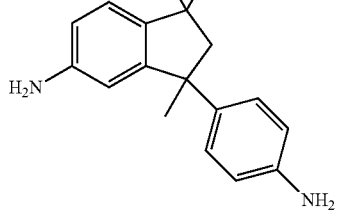

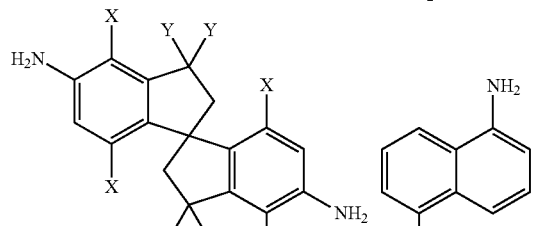

X = H or OMe or Me
Y = H or Me

The examples above have been described with reference to the production of polymers containing methanodibenzo diazocine moieties. Those skilled in the art will realise that the method mentioned above may be applied to produce other polymeric bicyclic diamines.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of forming a polymeric bicyclic diamine or quaternary ammonium cationic derivative thereof, the method comprising:
   Providing a first monomer comprising one or more aromatic moieties, the first monomer comprising at least two amino groups, each of the amino groups being attached to an aromatic moiety; and
   Contacting said first monomer with formaldehyde or a source of methylene.

2. A method according to claim 1 wherein the first monomer comprises two (and only two) amino groups or the first monomer comprises more than two amino groups.

3. A method according to claim 1 wherein two amino groups are provided on one aromatic moiety or two amino groups are provided on mutually different aromatic moieties.

4. A method according to claim 1, wherein the first monomer comprises two six-membered aromatic rings of carbon atoms, each six-membered aromatic ring being provided with one amino group.

5. A method according to claim 1, wherein the first monomer comprises three six-membered aromatic rings of carbon atoms, each six-membered aromatic ring being provided with one amino group.

6. A method according to claim 1, wherein the first monomer comprises four six-membered aromatic rings of carbon atoms, each six-membered aromatic ring being provided with one amino group.

7. A method according to claim 1 wherein a substituent is provided on an aromatic carbon atom adjacent to a carbon atom to which at least one of the at least two amino groups is attached.

8. A method according to claim 1, wherein an electron-donating substituent is provided on the aromatic moiety to which an amino group is attached, the electron-donating substituent being located so as to activate the substitution site adjacent to the carbon to which the amino group is attached.

9. A method according to claim 8 wherein the electron-donating group is located to avoid activation of substitution sites other than that adjacent to the carbon to which the amino group is attached.

10. A method according to claim 1 performed using step-growth polymerization and the polymerisation is performed in the presence of an acid.

11. A method according to claim 1 comprising forming a polymeric bicyclic diamine and subsequently forming therefrom a polymeric quaternary ammonium cationic polymer.

12. A method according to claim 11 comprising reacting the polymeric bicyclic diamine with an alkyl or benzyl halide.

13. A method according to claim 11, comprising reacting the polymeric bicyclic diamine with an alkyl dihalide or dihalide of xylene.

14. A method according to claim 11 comprising forming a polymeric quaternary ammonium cationic polymer with a first counter-anion and exchanging said first counter-anion for a second counter-anion.

15. A method according to claim 1 comprising providing a second monomer having a different structure from the first monomer, the second monomer comprising one or more aromatic moieties, the second monomer comprising at least two amino groups, each of the amino groups being attached to an aromatic moiety.

16. A method according to claim 15 comprising contacting the second monomer with the first monomer and formaldehyde or the source of methylene.

17. A method according to claim 15 comprising contacting the second monomer with formaldehyde or the source of methylene and an oligomer formed from the first monomer.

18. A method according to claim 1 whereby the polymer is formed at the interface between two immiscible liquids or at the surface of a solid or macroporous substrate.

19. A method according to claim 1 wherein the first monomer, (or second monomer, if present) comprises one or more of a metal-bonding ring group, a spiro group and at least one chiral carbon atom.

* * * * *